(12) United States Patent
Nakagawa et al.

(10) Patent No.: US 11,615,808 B2
(45) Date of Patent: *Mar. 28, 2023

(54) MAGNETIC HEAD AND MAGNETIC RECORDING DEVICE

(71) Applicants: KABUSHIKI KAISHA TOSHIBA, Tokyo (JP); TOSHIBA ELECTRONIC DEVICES & STORAGE CORPORATION, Tokyo (JP)

(72) Inventors: Yuji Nakagawa, Kawasaki (JP); Naoyuki Narita, Funabashi (JP); Masayuki Takagishi, Kunitachi (JP); Tomoyuki Maeda, Kawasaki (JP); Tazumi Nagasawa, Yokohama (JP); Hirofumi Suto, Ota (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/397,188

(22) Filed: Aug. 9, 2021

(65) Prior Publication Data

US 2022/0270640 A1 Aug. 25, 2022

(30) Foreign Application Priority Data

Feb. 25, 2021 (JP) .............................. JP2021-028527

(51) Int. Cl.
*G11B 5/187* (2006.01)
*G11B 5/31* (2006.01)
(52) U.S. Cl.
CPC .......... *G11B 5/1877* (2013.01); *G11B 5/3116* (2013.01)

(58) Field of Classification Search
None
See application file for complete search history.

(56) References Cited

U.S. PATENT DOCUMENTS 7,616,413 B2    11/2009   Lee
8,264,799 B2    9/2012    Akiyama et al.
(Continued)

FOREIGN PATENT DOCUMENTS

JP    2008-277586 A    11/2008
JP    2008-305486 A    12/2008
JP    2012-146351 A    8/2012

*Primary Examiner* — William J Klimowicz
(74) *Attorney, Agent, or Firm* — Oblon, McClelland, Maier & Neustadt, L.L.P.

(57) ABSTRACT

According to one embodiment, a magnetic head includes first and second magnetic poles, and a stacked body provided between the first and second magnetic poles. The stacked body includes a first magnetic layer, a second magnetic layer provided between the second magnetic pole and the first magnetic layer, a third magnetic layer provided between the second magnetic pole and the second magnetic layer, a first non-magnetic layer provided between the first magnetic layer and the first magnetic pole, a second non-magnetic layer provided between the second and first magnetic layers, a third non-magnetic layer provided between the third and second magnetic layers, and a fourth non-magnetic layer provided between the second magnetic pole and the third magnetic layer. A thickness of the first magnetic layer is thicker than a thickness of the second magnetic layer. A thickness of the third magnetic layer is thicker than the second layer thickness.

19 Claims, 13 Drawing Sheets

(56) References Cited

U.S. PATENT DOCUMENTS

| | | | |
|---|---|---|---|
| 8,345,380 B2 | 1/2013 | Sato et al. | |
| 8,472,140 B2 * | 6/2013 | Yamada | H01L 43/08 |
| | | | 360/125.3 |
| 9,064,508 B1 * | 6/2015 | Shiimoto | G11B 5/187 |
| 9,792,930 B1 * | 10/2017 | Shimizu | G11B 5/3133 |
| 10,121,497 B1 * | 11/2018 | Takahashi | G11B 5/235 |
| 10,839,833 B1 * | 11/2020 | Freitag | H01F 10/3286 |
| 2008/0304176 A1 | 12/2008 | Takagishi et al. | |
| 2012/0176702 A1 | 7/2012 | Yamada et al. | |
| 2015/0348574 A1 * | 12/2015 | Igarashi | G11B 5/1278 |
| | | | 360/99.08 |
| 2018/0254058 A1 * | 9/2018 | Chen | G11B 5/3146 |
| 2019/0244635 A1 * | 8/2019 | Goncharov | G11B 5/11 |
| 2020/0294535 A1 * | 9/2020 | Narita | G11B 5/1278 |
| 2020/0294537 A1 * | 9/2020 | Nagasawa | G11B 5/235 |
| 2021/0407534 A1 * | 12/2021 | Freitag | G11B 5/3133 |

* cited by examiner

MAGNETIC HEAD AND MAGNETIC RECORDING DEVICE

CROSS-REFERENCE TO RELATED APPLICATIONS

This application is based upon and claims the benefit of priority from Japanese Patent Application No. 2021-028527, filed on Feb. 25, 2021; the entire contents of which are incorporated herein by reference.

FIELD

Embodiments described herein relate generally to a magnetic head and a magnetic recording device.

BACKGROUND

Information is recorded on a magnetic recording medium such as an HDD (Hard Disk Drive) using a magnetic head. It is desired to improve the recording density in the magnetic head and the magnetic recording device.

DETAILED DESCRIPTION

Figure 1A:
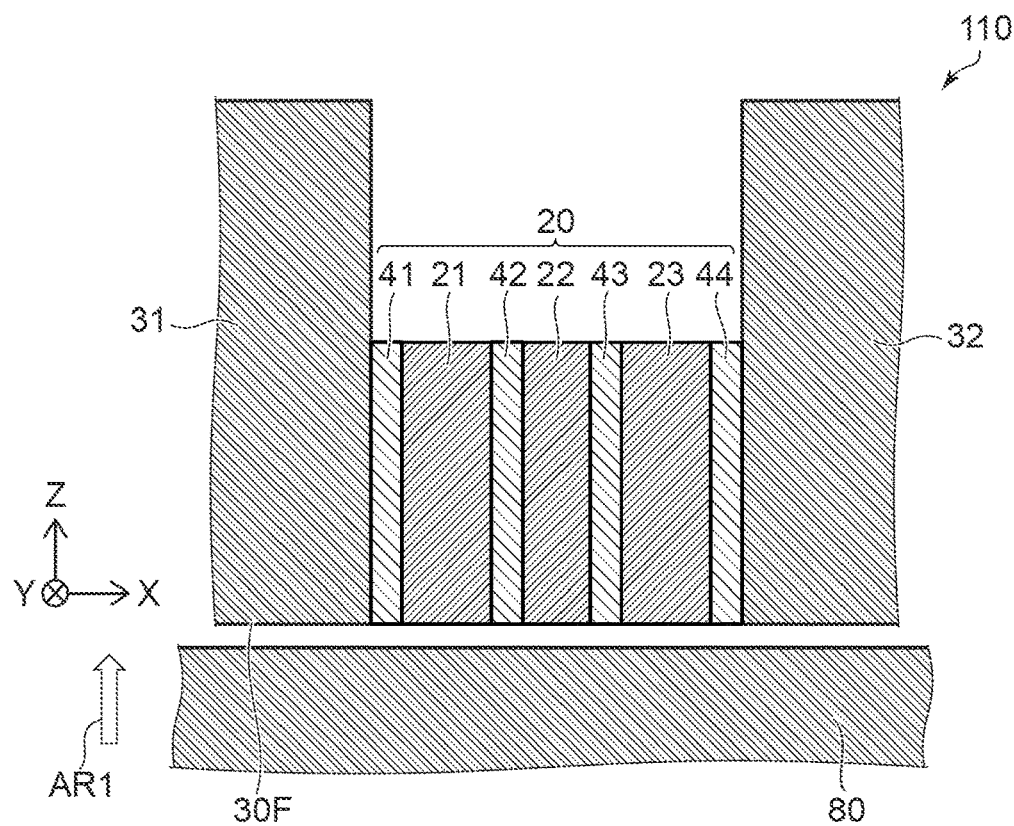
FIGS. 1A and 1B are schematic views illustrating a magnetic head according to a first embodiment.

According to one embodiment, a magnetic head includes a first magnetic pole, a second magnetic pole, and a stacked body provided between the first magnetic pole and the second magnetic pole. The stacked body includes a first magnetic layer, a second magnetic layer provided between the second magnetic pole and the first magnetic layer, a third magnetic layer provided between the second magnetic pole and the second magnetic layer, a first non-magnetic layer provided between the first magnetic layer and the first magnetic pole, a second non-magnetic layer provided between the second magnetic layer and the first magnetic layer, a third non-magnetic layer provided between the third magnetic layer and the second magnetic layer, and a fourth non-magnetic layer provided between the second magnetic pole and the third magnetic layer. A first thickness of the first magnetic layer along a first direction from the first magnetic pole toward the second magnetic pole is thicker than a second thickness of the second magnetic layer along the first direction. A third thickness of the third magnetic layer along the first direction is thicker than the second thickness.

According to one embodiment, a magnetic recording device includes the magnetic head described above, and an electric circuit. The electric circuit is configured to supply a current to the stacked body, and the current has a direction from the first magnetic layer toward the second magnetic layer.

Various embodiments are described below with reference to the accompanying drawings.

The drawings are schematic and conceptual; and the relationships between the thickness and width of portions, the proportions of sizes among portions, etc., are not necessarily the same as the actual values. The dimensions and proportions may be illustrated differently among drawings, even for identical portions.

In the specification and drawings, components similar to those described previously or illustrated in an antecedent drawing are marked with like reference numerals, and a detailed description is omitted as appropriate.

First Embodiment

Figure 1B:
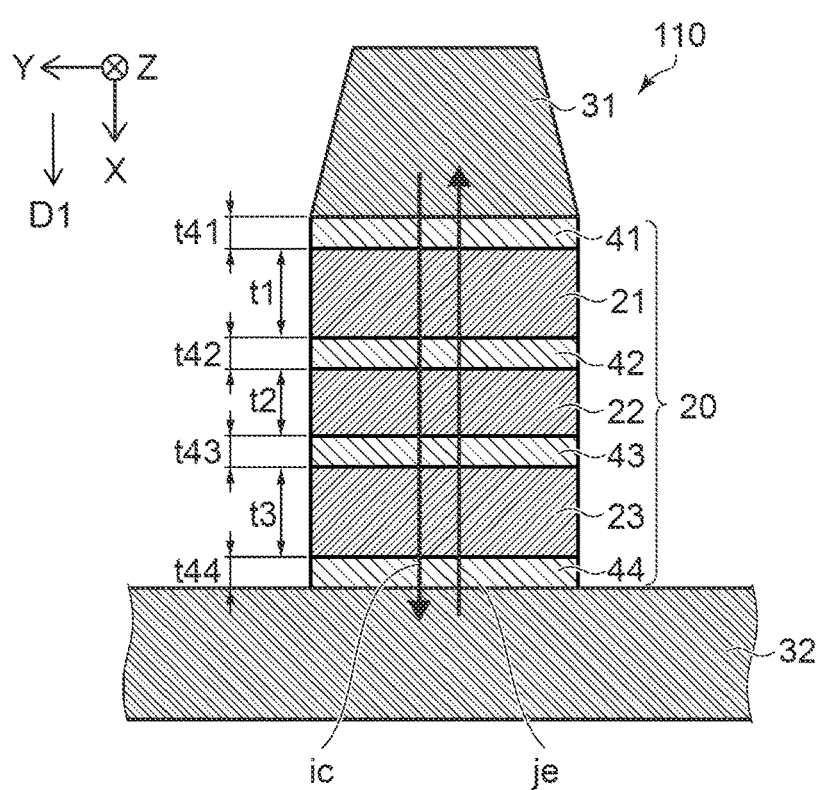

FIGS. 1A and 1B are schematic views illustrating a magnetic head according to a first embodiment FIG. 1A is a cross-sectional view. FIG. 1B is a plan view viewed in a direction of an arrow AR1 of FIG. 1A.

Figure 2:
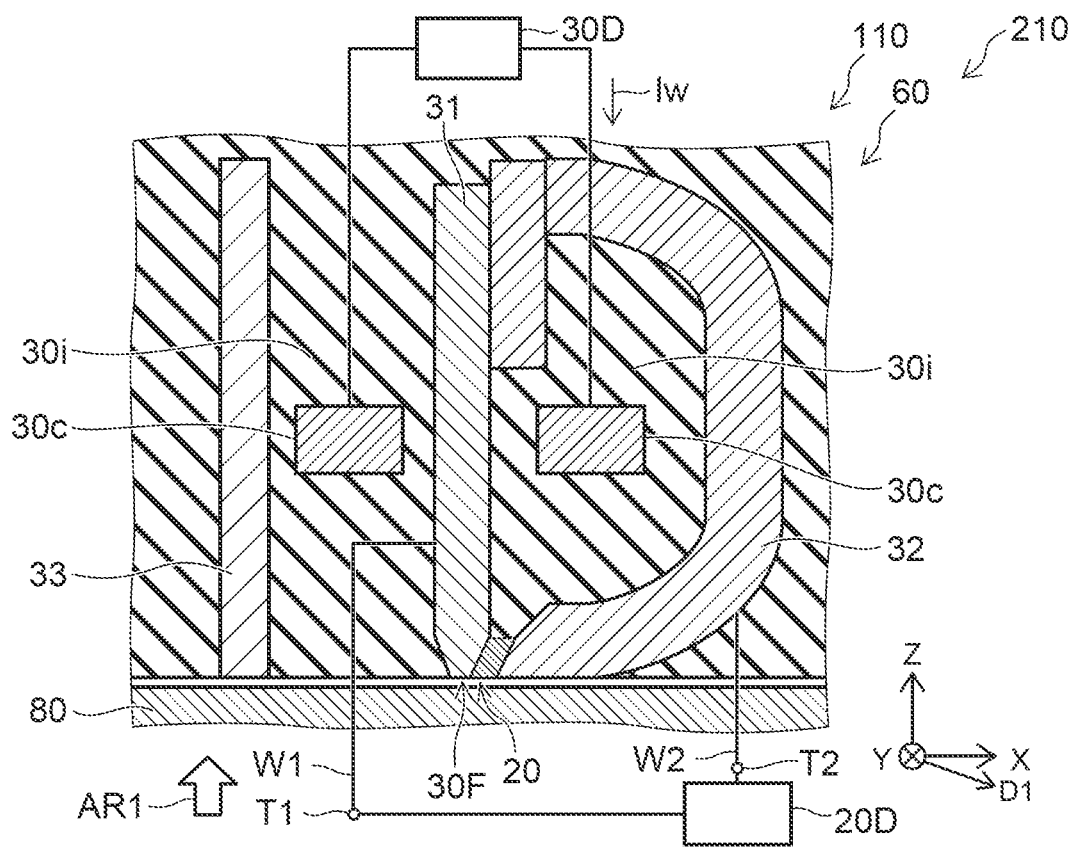
FIG. 2 is a schematic cross-sectional view illustrating a magnetic recording device according to the first embodiment.

FIG. 2 is a schematic cross-sectional view illustrating a magnetic recording device according to the first embodiment.

As shown in FIG. 2, a magnetic recording device 210 according to the embodiment includes a magnetic head 110 and an electric circuit 20D. The magnetic recording device 210 may include a magnetic recording medium 80. At least the recording operation is performed in the magnetic recording device 210. In the recording operation, information is recorded on the magnetic recording medium 80 using the magnetic head 110.

The magnetic head 110 includes a recording part 60. As will be described later, the magnetic head 110 may include a reproducing part. The recording unit 60 includes a first magnetic pole 31, a second magnetic pole 32, and a stacked body 20. The stacked body 20 is provided between the first magnetic pole 31 and the second magnetic pole 32.

For example, the first magnetic pole 31 and the second magnetic pole 32 form a magnetic circuit. The first magnetic pole 31 is, for example, a major magnetic pole. The second magnetic pole 32 is, for example, a trailing shield. The first magnetic pole 31 may be a trailing shield, and the second magnetic pole 32 may be a major magnetic pole.

The direction from the magnetic recording medium 80 toward the magnetic head 110 is taken as a Z-axis direction. One direction perpendicular to the Z-axis direction is taken as an X-axis direction. The direction perpendicular to the Z-axis direction and the X-axis direction is taken as a Y-axis direction. The Z-axis direction corresponds to, for example, a height direction. The X-axis direction corresponds to, for example, a down track direction. The Y-axis direction corresponds to, for example, a cross-track direction. The magnetic recording medium 80 and the magnetic head 110 move relatively along the down track direction. A magnetic field (recording magnetic field) generated from the magnetic head 110 is applied to a desired position of the magnetic recording medium 80. The magnetization of the magnetic recording medium 80 at a desired position is controlled in a direction corresponding to the recording magnetic field. As a result, information is recorded on the magnetic recording medium 80.

The direction from the first magnetic pole 31 toward the second magnetic pole 32 is taken as a first direction D1. The first direction D1 substantially follows the X-axis direction. In the embodiment, the first direction D1 may be inclined at a small angle with respect to the X-axis direction.

As shown in FIG. 2, a coil 30c is provided. In this example, a portion of the coil 30c is between the first magnetic pole 31 and the second magnetic pole 32. In this example, a shield 33 is provided. In the X-axis direction, there is the first magnetic pole 31 between the shield 33 and the second magnetic pole 32. Another portion of the coil 30c is between the shield 33 and the first magnetic pole 31. An insulating portion 30i is provided between these multiple elements. The shield 33 is, for example, a leading shield. The magnetic head 110 may include a side shield (not shown).

As shown in FIG. 2, a recording current Iw is supplied to the coil 30c from a recording circuit 30D. A recording magnetic field corresponding to the recording current Iw is applied to the magnetic recording medium 80 from the first magnetic pole 31.

As shown in FIG. 2, the first magnetic pole 31 includes a medium facing surface 30F. The medium facing surface 30F is, for example, ABS (Air Bearing Surface). The medium facing surface 30F faces, for example, the magnetic recording medium 80. The medium facing surface 30F is, for example, along the XY plane.

As shown in FIG. 2, the electric circuit 20D is electrically connected to the stacked body 20. In this example, the stacked body 20 is electrically connected to the first magnetic pole 31 and the second magnetic pole 32. The magnetic head 110 is provided with a first terminal T1 and a second terminal T2. The first terminal T1 is electrically connected to the stacked body 20 via a first wiring W1 and the first magnetic pole 31. The second terminal T2 is electrically connected to the stacked body 20 via a second wiring W2 and the second magnetic pole 32. From the electric circuit 20D, for example, a current (for example, a direct current) is supplied to the stacked body 20.

As shown in FIGS. 1A and 1B, the stacked body 20 includes a first magnetic layer 21, a second magnetic layer 22, a third magnetic layer 23, a first non-magnetic layer 41, and a second non-magnetic layer 42, a third non-magnetic layer 43 and a fourth non-magnetic layer 44. In FIGS. 1A and 1B, the insulating portion 30i is omitted.

The first magnetic layer 21 is provided between the first magnetic pole 31 and the second magnetic pole 32. The second magnetic layer 22 is provided between the second magnetic pole 32 and the first magnetic layer 21. The third magnetic layer 23 is provided between the second magnetic pole 32 and the second magnetic layer 22. The first non-magnetic layer 41 is provided between the first magnetic layer 21 and the first magnetic pole 31. The second non-magnetic layer 42 is provided between the second magnetic layer 22 and the first magnetic layer 21. The third non-magnetic layer 43 is provided between the third magnetic layer 23 and the second magnetic pole layer 22. The fourth non-magnetic layer 44 is provided between the second magnetic pole 32 and the third magnetic layer 23.

For example, the first non-magnetic layer 41 may be in contact with the first magnetic layer 21 and the first magnetic pole 31. The second non-magnetic layer 42 may be in contact with the second magnetic layer 22 and the first magnetic layer 21. The third non-magnetic layer 43 may be in contact with the third magnetic layer 23 and the second magnetic layer 22. The fourth non-magnetic layer 42 may be in contact with the second magnetic pole 32 and the third magnetic layer 23.

The first magnetic layer 21, the second magnetic layer 22, and the third magnetic layer 23 include a first element including at least one selected from the group consisting of Fe, Co, and Ni. These magnetic layers may include, for example, a FeCo alloy or the like.

The first non-magnetic layer 41 includes, for example, at least one selected from the group consisting of Cu, Au, Cr, Al, V and Ag. The fourth non-magnetic layer 44 includes, for example, at least one selected from the group consisting of Ru, Jr, Ta, Rh, Pd, Pt and W. As described above, in the stacked body 20, the first non-magnetic layer 41 and the fourth non-magnetic layer 44 are asymmetric.

The third non-magnetic layer 43 may include, for example, at least one selected from the group consisting of Cu, Au, Cr, Al, V and Ag. The second non-magnetic layer 42 may include, for example, at least one selected from the group consisting of Ru, Ir, Ta, Rh, Pd, Pt and W. As described above, in the stacked body 20, the third non-magnetic layer 43 and the second non-magnetic layer 42 may be asymmetrical.

As shown in FIG. 1B, a current ic is supplied to such a stacked body 20. The current ic is supplied from, for example, the electric circuit 20D described above. As shown in FIG. 1B, the current ic has a direction from the first magnetic layer 21 toward the second magnetic layer 22. As shown in FIG. 1B, an electron flow je accompanying the current ic has a direction from the second magnetic layer 22 toward the first magnetic layer 21. The direction of the current ic is the direction from the first magnetic pole 31 toward the second magnetic pole 32.

For example, when the current ic equal to or higher than the threshold value flows through the laminated body 20, the magnetization of the magnetic layer included in the stacked body 20 oscillates. The stacked body 20 functions as, for example, an STO (Spin-Torque Oscillator). An alternating magnetic field (for example, a high frequency magnetic field) is generated from the stacked body 20 with the oscillation. The alternating magnetic field generated by the stacked body 20 is applied to the magnetic recording medium 80, and writing to the magnetic recording medium 80 is assisted. For example, MAMR (Microwave Assisted Magnetic Recording) can be performed.

In the magnetic head 110, the first magnetic layer 21 and the third magnetic layer 23 function as, for example, an oscillation layer. For example, the magnetization of the first magnetic layer 21 and the magnetization of the third magnetic layer 23 rotate in reverse phases (for example, in a state where the opposite directions are kept). The second magnetic layer 22 functions as, for example, a spin injection layer. During operation, the direction of magnetization of the second magnetic layer 22 can be changed.

As shown in FIG. 1B, the thickness of the first magnetic layer 21 along the first direction D1 (direction from the first magnetic pole 31 toward the second magnetic pole 32) is taken as a first thickness t1. The thickness of the second magnetic layer 22 along the first direction D1 is taken as a second thickness t2. The thickness of the third magnetic layer 23 along the first direction D1 is taken as a third thickness t3. In the embodiment, the first thickness t1 is thicker than the second thickness t2. The third thickness t3 is thicker than the second thickness t2. This makes it easier to obtain oscillation, as will be described later.

The thickness of the first non-magnetic layer 41 along the first direction D1 is taken as a thickness t41. The thickness of the second non-magnetic layer 42 along the first direction D1 is taken as a thickness t42. The thickness of the third non-magnetic layer 43 along the first direction D1 is taken as a thickness t43. The thickness of the fourth non-magnetic layer 44 along the first direction D1 is taken as a thickness t44. These thicknesses are, for example, not less than 0.5 nm and not more than 6 nm. When these thicknesses are not less than 0.5 nm, for example, it is easy to reduce the magnetic coupling. For example, it is easy to obtain high oscillation strength. When these thicknesses are not more than 6 nm, for example, the spin transmittance tends to be high. For example, it is easy to obtain high oscillation strength. For example, the recording gap can be reduced. For example, it is easy to obtain a high recording density.

In the following, an example of simulation results regarding the behavior of oscillation in the stacked body 20 will be described. In the first model of the simulation, the configuration shown in FIG. 1B is provided. That is, the first magnetic pole 31, the second magnetic pole 32, the first to third magnetic layers 21 to 23, and the first to fourth non-magnetic layers 41 to 44 are provided. As the physical characteristic values of the first and third magnetic layers 21 and 23, the physical characteristic values of the $Fe_{70}Co_{30}$ alloy are used. The first thickness t1 is 6.5 nm. The third thickness t3 is 6.5 nm. The second thickness t2 is 3 nm. As the physical characteristic value of the second magnetic layer 22, the physical characteristic value of the FeNi alloy is used. In this example, the FeNi alloy is $Fe_{78}Ni_{22}$. Thus, in the first model, the first thickness t1 and the third thickness t3 are thicker than the second thickness t2. The physical characteristic value of Cu is used as the physical characteristic value of the first non-magnetic layer 41 and the third non-magnetic layer 43. The physical characteristic value of Ta is used as the physical characteristic value of the second non-magnetic layer 42 and the fourth non-magnetic layer 44. The thicknesses t41 to t44 are 2 nm.

In the second model of the simulation, the first magnetic pole 31, the second magnetic pole 32, the first to third magnetic layers 21 to 23, and the first to fourth non-magnetic layers 41 to 44 are provided. The first thickness t1 is 6.5 nm. The second thickness t2 is 6.5 nm. The third thickness t3 is 3 nm. As the physical characteristic values of the first and second magnetic layers 21 and 22, the physical characteristic values of the $Fe_{70}Co_{30}$ alloy are used. As the physical characteristic value of the third magnetic layer 23, the physical characteristic value of the $Fe_{78}Ni_{22}$ alloy is used. Thus, in the second model, the first thickness t1 and the second thickness t2 are thicker than the third thickness t3. Other configurations in the second model are the same as in the first model. In the second model, the first magnetic layer 21 and the second magnetic layer 22 function as, for example, an oscillation layer.

In these models, the oscillation characteristics of the magnetization when the current ic illustrated in FIG. 1B is supplied are simulated.

Figure 3:
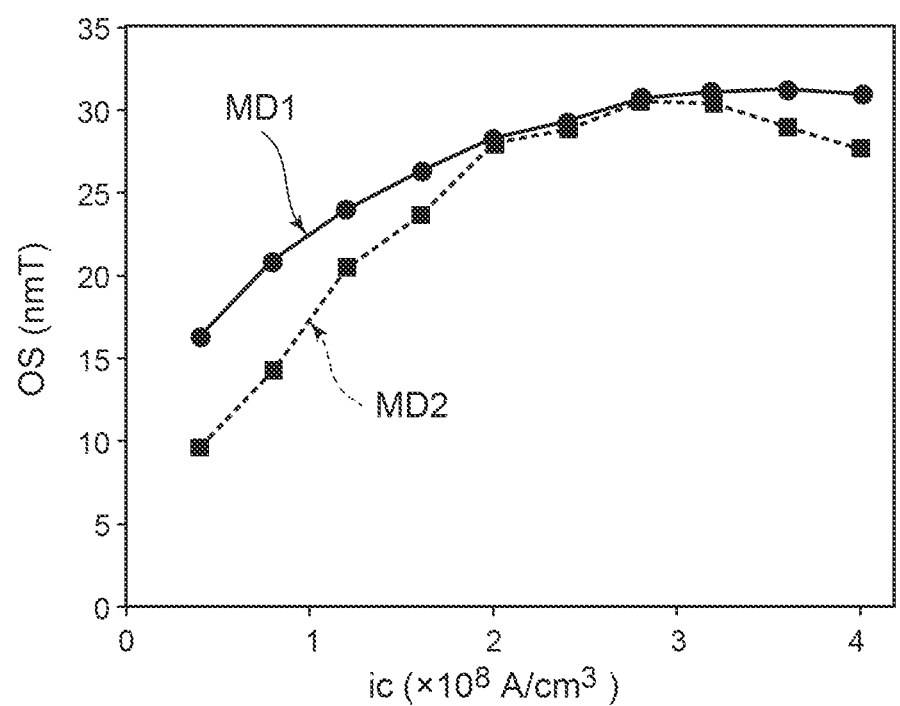
FIG. 3 is a graph view illustrating characteristics of the magnetic head.

FIG. 3 is a graph view illustrating characteristics of the magnetic head.

The horizontal axis of FIG. 3 is the current ic (relative value). The vertical axis is the oscillation strength OS. In the first model of the simulation, the oscillation strength OS is the sum of the product of the amplitude of the oscillation of the magnetization of the first magnetic layer 21 and the first thickness t1, and the product of the amplitude of the oscillation of the magnetization of the third magnetic layer 23 and the third thickness t3. In the second model of the simulation, it is the sum of the product of the amplitude of the oscillation of the magnetization of the first magnetic layer 21 and the first thickness t1, and the product of the amplitude of the oscillation of the magnetization of the second magnetic layer 22 and the second thickness t2. When the oscillation strength OS is high, for example, the recording density by MAMR is likely to be improved.

As shown in FIG. 3, the oscillation strength OS of the first model MD1 is higher than the oscillation strength OS of the second model MD2 in the region where the current ic is small. As described above, it was found that a high oscillation strength OS can be obtained by making the first thickness t1 and the third thickness t3 thicker than the second thickness t2. For example, in the first model MD1, in the oscillating state, the magnetization of the second magnetic layer 22 and the magnetization of the third magnetic layer have components in the same direction with respect to the first direction. For example, in the second model MD2, the magnetization of the second magnetic layer 22 and the magnetization of the third magnetic layer have different directions with respect to the first direction in the oscillating state. Such a difference may be related to the difference in the oscillation strength OS. For example, it is thought that in the second model MD2, the fact that the magnetization of the second magnetic layer 22 and the magnetization of the third magnetic layer need to have different directions with respect to the first direction is related to the difference in the oscillation strength OS.

According to the embodiment, for example, a high oscillation strength OS can be obtained. More stable oscillation can be obtained. According to the embodiment, stable MAMR can be carried out. It is possible to provide a magnetic head which is possible to improve the recording density.

Figure 4A:
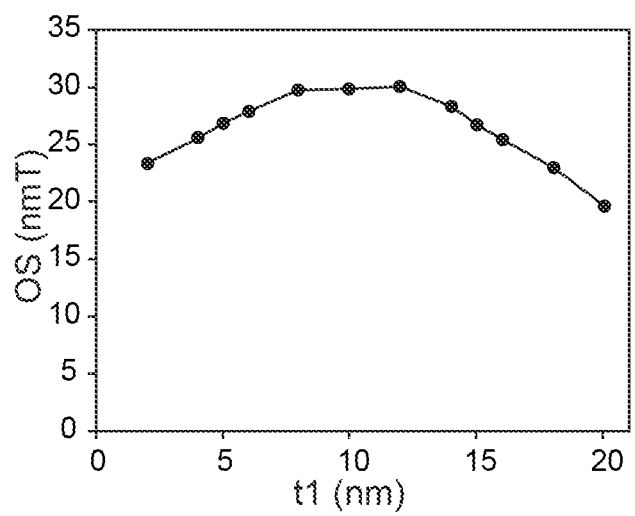
FIGS. 4A to 4C are graph views illustrating characteristics of the magnetic head.
Figure 4B:
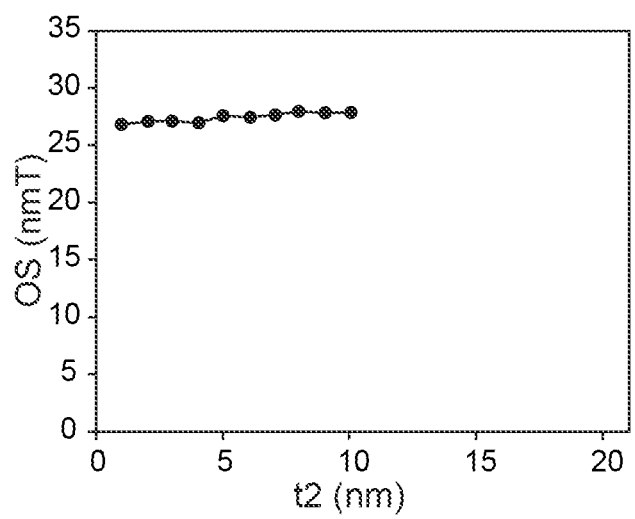

FIGS. 4A and 4B are graph views illustrating characteristics of the magnetic head.

Figure 4C:
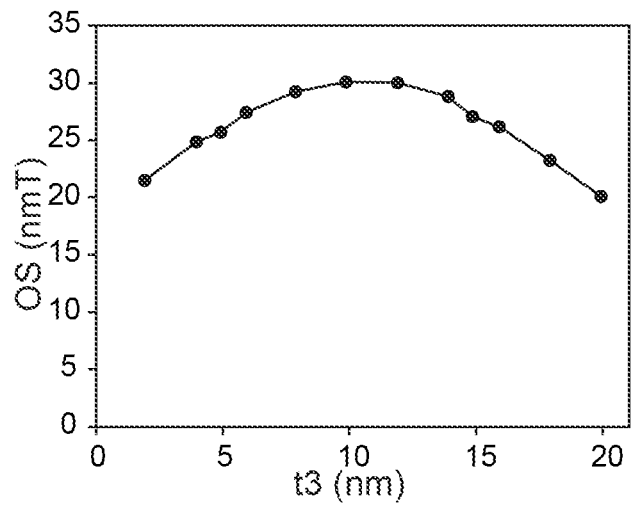

The horizontal axis of FIG. 4A is the first thickness t1. In FIG. 4A, the second thickness t2 is 3 nm and the third thickness t3 is 12 nm. The horizontal axis of FIG. 4B is the second thickness t2. In FIG. 4B, the first thickness t1 is 8 nm and the third thickness t3 is 8 nm. The horizontal axis of FIG. 4C is the third thickness t3. In FIG. 4C, the first thickness t1 is 12 nm and the second thickness t2 is 3 nm. In these figures, the current ic supplied to the stacked body 20 is $1.2 \times 10^8$ A/cm². The vertical axis of these figures is the oscillation strength OS.

As shown in FIG. 4A, the first thickness t1 is preferably not less than 5 nm and not more than 15 nm. As a result, a high oscillation strength OS can be obtained.

As shown in FIG. 4C, the third thickness t3 is preferably bot less than 5 nm and no more than 15 nm. As a result, a high oscillation strength OS can be obtained.

As shown in FIG. 4B, the oscillation strength OS does not substantially change in the range of the second thickness t2 of 1 nm to 10 nm. Therefore, the second thickness t2 may be thin. For example, the second thickness t2 may be not more than 5 nm. Since the second thickness t2 is thin, the thickness of the stacked body 20 becomes thin. For example, the distance (recording gap) between the first magnetic pole 31 and the second magnetic pole 32 can be reduced. This makes it easier to obtain a high recording density. For example, the second thickness t2 may be not more than 3 nm. For example, the second thickness t2 may be not more than 2 nm.

Figure 5A:
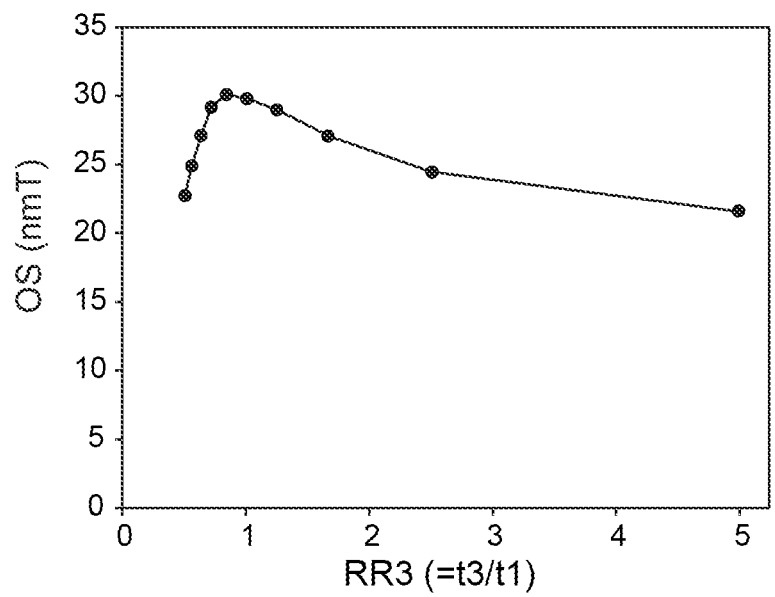
FIGS. 5A and 5B are graph views illustrating characteristics of the magnetic head.
Figure 5B:
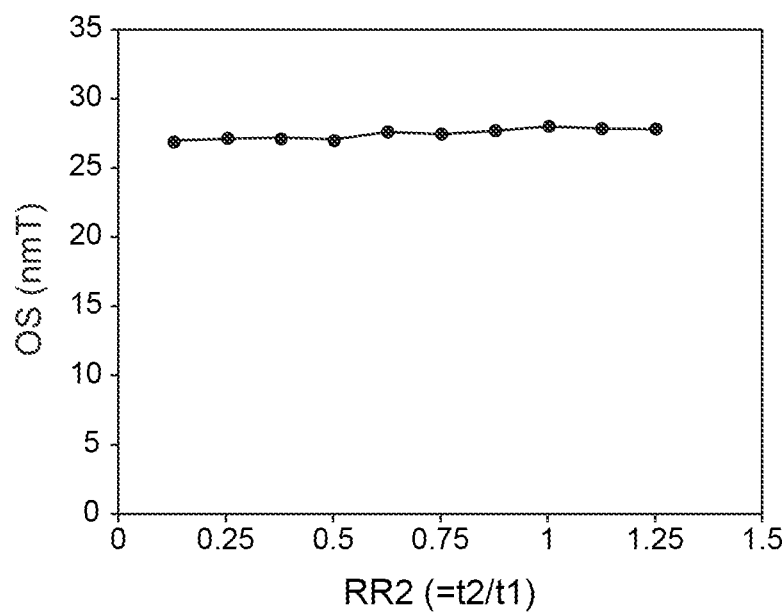

FIGS. 5a and 5B are graph views illustrating characteristics of the magnetic head.

The horizontal axis of FIG. 5A is a ratio RR3. The ratio RR3 is a ratio of the third thickness t3 to the first thickness t1. The horizontal axis of FIG. 5B is a ratio RR2. The ratio RR2 is a ratio of the second thickness t2 to the first thickness t1. In FIG. 5A, the ratio RR2 is 0.3. In FIG. 5B, the ratio RR3 is 1.

As shown in FIG. 5A, the ratio RR3 is preferably close to 1. As a result, a high oscillation strength OS can be obtained. For example, the third thickness t3 is preferably not less than 0.7 times and not more than 1.7 times the first thickness t1. For example, the third thickness t3 may be not less than 0.6 times and not more than 1.25 times the first thickness t1. A high oscillation strength OS can be obtained.

As shown in FIG. 5B, the oscillation strength OS does not substantially change in the range of the ratio RR2 of 0.2 to 1.3. The ratio RR2 is preferably low. It is easy to reduce the recording gap. For example, the second thickness t2 is preferably not more than 0.7 times the first thickness t1, for example. The second thickness t2 may be, for example, not more than 0.5 times the first thickness t1. The second thickness t2 is preferably not more than 0.7 times the third thickness t3, for example. The second thickness t2 may be, for example, not more than 0.5 times the third thickness t3. For example, it is easy to reduce the recording gap. For example, it is easy to obtain a high recording density.

As described above, the first magnetic layer 21, the second magnetic layer 22, and the third magnetic layer 23 include a first element including at least one selected from the group consisting of Fe, Co, and Ni. In the embodiment, the first magnetic layer 21, the second magnetic layer 22, and the third magnetic layer 23 substantially does not include a second element including at least one selected from the group consisting of Cr, V, Mn, Ti, and Sc. Alternatively, the concentration of the second element in the first magnetic layer 21, the second magnetic layer 22, and the third magnetic layer 23 is less than 10 atm %. For example, the first to third magnetic layers 21 to 23 have, for example, positive polarization. In such a magnetic layer, stable oscillation can be easily obtained.

Figure 6:
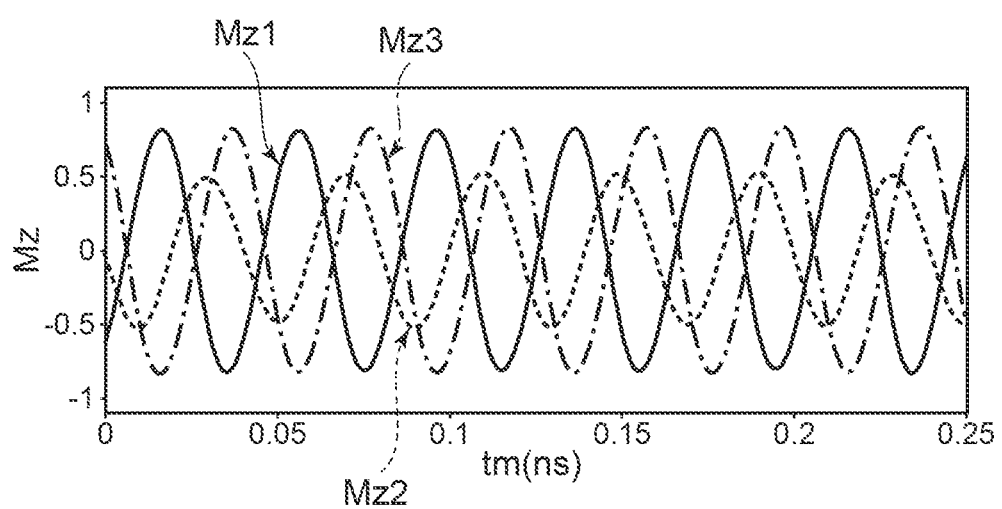
FIG. 6 is a schematic view illustrating characteristics of the magnetic head according to the first embodiment.

FIG. 6 is a schematic view illustrating characteristics of the magnetic head according to the first embodiment The horizontal axis of FIG. 6 is time tm. The vertical axis is the magnetization Mz (normalized value). FIG. 6 shows an example relating to the first magnetization Mz1 of the first magnetic layer 21, the second magnetization Mz2 of the second magnetic layer 22, and the magnetization Mz3 of the third magnetic layer 23. As shown in FIG. 6, when the current is in the direction from the first magnetic layer 21 toward the second magnetic layer 22 is supplied to the stacked body 20, the first magnetized Mz1 and the third magnetized Mz3 rotate in reverse phases (for example, in a state where the opposite directions are kept). FIG. 6 also illustrates the second magnetization Mz2 of the second magnetic layer 22. In this example, the second magnetization Mz2 also rotates. The phase of the second magnetization Mz2 is different from the phase of the first magnetization Mz1 and is different from the phase of the third magnetization Mz3. The period of the second magnetization Mz2 is the same as the period of the first magnetization Mz1, and is the same as the period of the third magnetization Mz3.

Figure 7A:
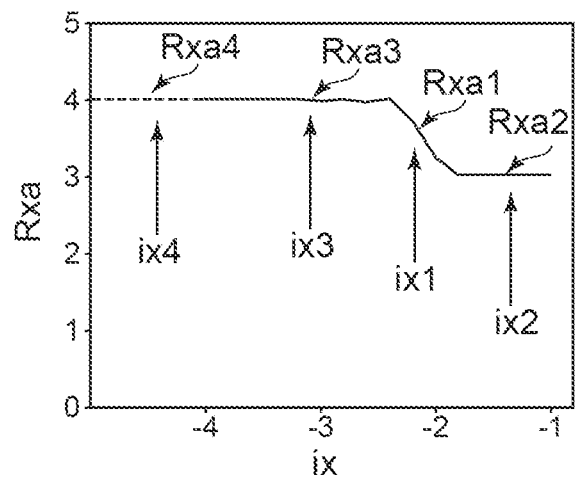
FIGS. 7A and 7B are schematic views illustrating characteristics of the magnetic head according to the first embodiment.
Figure 7B:
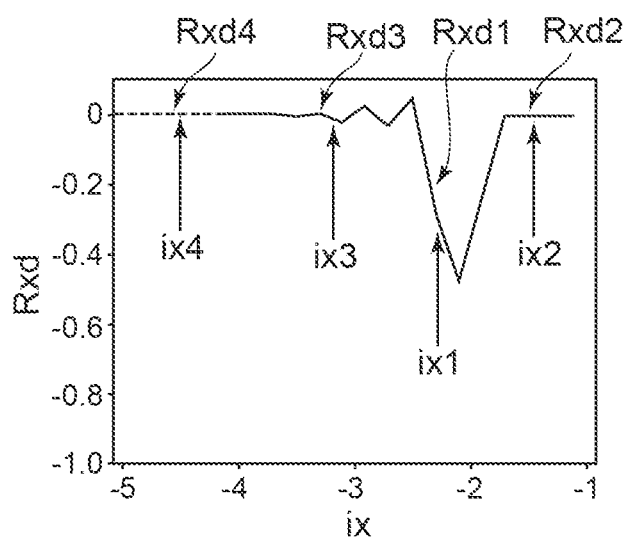

FIGS. 7A and 7B are schematic views illustrating characteristics of the magnetic head according to the first embodiment.

These figures show an example of the characteristics of the magnetic head 110 when a current ix is supplied to the stacked body 20 and the recording current Iw is supplied to the coil 30c. In this case, the recording magnetic field is generated from at least one of the first magnetic pole 31 and the second magnetic pole 32. A portion of the recording magnetic field is applied to the stacked body 20. The direction of the current ix is opposite to the direction of the current is illustrated in FIG. 1C. The direction of the current ix has a direction from the second magnetic layer 22 toward the first magnetic layer 21. The current ix is a negative current.

The horizontal axis of FIGS. 7A and 7B is the current ix supplied to the stacked body 20. The current ix is indicated by a relative value. The vertical axis of FIG. 7A is a temporal average value Rxa of an electrical resistance Rx of the stacked body 20. The temporal average also suppresses the effects of noise, for example. The vertical axis of FIG. 7B is a rate of change Rxd of the temporal average value of the electrical resistance Rx of the stacked body 20 when the absolute value of the current ix is reduced.

As shown in FIG. 7A, the temporal average value Rxa of the electrical resistance Rx of the stacked body 20 at a first current ix1 is a first resistance Rxa1. In a second current ix2, the average value Rxa is a second resistor Rxa2. In the third current ix3, the average value Rxa is a third resistor Rxa3. The absolute value of the first current ix1 is larger than the absolute value of the second current ix2 and smaller than the absolute value of the third current ix3. The first resistance Rxa1 is higher than the second resistance Rxa2 and is lower than the third resistance Rxa3.

As shown in FIG. 7B, the rate of change Rxd of the temporal average value Rxa of the electrical resistance Rx at the first current ix1 is a first rate of change Rxd1. In the second current ix2, the rate of change Rxd is a second rate of change Rxd2. In the third current ix3, the rate of change Rxd is a third rate of change Rxd3. The absolute value of the first rate of change Rxd1 is larger than the absolute value of the second rate of change Rxd2 and larger than the absolute value of the third rate of change Rxd3. The absolute value of the second rate of change Rxd2 may be smaller than the third rate of change Rxd3.

As shown in FIG. 7A, at a fourth current ix4, the temporal average value Rxa of the electric resistance Rx of the stacked body 20 is a fourth resistance Rxa4. The absolute value of the fourth current ix4 is larger than the absolute value of the third current ix3. The fourth resistance Rxa4 may be higher than the first resistance Rxa1.

As shown in FIG. 7B, at the fourth current ix4, the rate of change Rxd of the temporal average value Rxa of the electrical resistance Rx is a fourth rate of change Rxd4. The absolute value of the first rate of change Rxd1 may be larger than the absolute value of the fourth rate of change Rxd4. In the fourth current ix4, the third magnetic layer 23 may function as an oscillation layer.

Such a property may be related to the third thickness t3 of the third magnetic layer 23 being thicker than the second thickness t2 of the second magnetic layer 22. In such a combination, when the current ix is supplied in the negative direction, the spin torque reflected by the third magnetic layer 23 acts on the second magnetic layer 22. For example, when the absolute value of the current ix increases, it is considered that the magnetization of the second magnetic layer 22 is reversed, the second magnetic layer 22 and the third magnetic layer 23 become close to antiparallel to each other, and the resistance increases. It is considered that the rate of change of resistance increases.

Figure 8A:
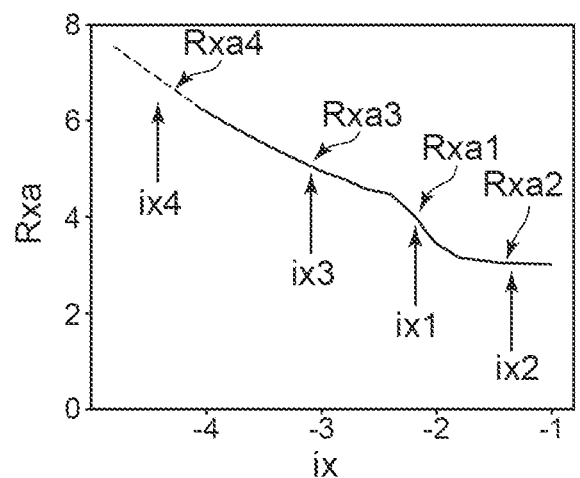
FIGS. 8A and 8B are schematic views illustrating characteristics of the magnetic head according to the first embodiment.
Figure 8B:
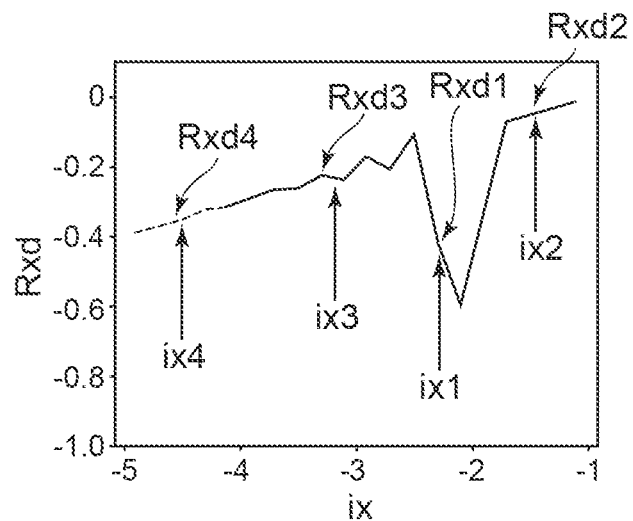

FIGS. 8A and 8B are schematic views illustrating characteristics of the magnetic head according to the first embodiment.

These show another example of the characteristics of the magnetic head 110 when the current ix is supplied to the stacked body 20 and the recording current Iw is supplied to the coil 30c. Also in these figures, the current ix is supplied to the stacked body 20, and the recording current Iw is supplied to the coil 30c. The direction of the current ix is opposite to the direction of the current is illustrated in FIG. 1C. The horizontal axis of FIGS. 8A and 8B is the current ix supplied to the stacked body 20. The vertical axis of FIG. 8A is the temporal average value Rxa of the electrical resistance Rx of the stacked body 20. The vertical axis of FIG. 8B is the rate of change Rxd of the temporal average value of the electrical resistance Rx of the stacked body 20 when the absolute value of the current ix is reduced.

As shown in FIG. 8A, the average value Rxa of the electrical resistance Rx may be generally inclined (for example, a characteristic of a quadratic function) with respect to the current ix. Such characteristics are based on, for example, the temperature rise of the stacked body 20 due to the current ix.

As shown in FIG. 8A, in the first to third currents ix1 to ix3, the average value Rxa is the first to third resistances Rxa1 to Rxa3, respectively. The absolute value of the first current ix1 is larger than the absolute value of the second current ix2 and smaller than the absolute value of the third current ix3. The first resistance Rxa1 is higher than the second resistance Rxa2 and is lower than the third resistance Rxa3.

As shown in FIG. 8B, the rate of change Rxd of the temporal average value Rxa of the electrical resistance Rx in the first to third currents ix1 to ix3 is the first to third rate of change Rxd1 to Rxd3, respectively. The absolute value of the first rate of change Rxd1 is larger than the absolute value of the second rate of change Rxd2 and larger than the absolute value of the third rate of change Rxd3. The absolute value of the second rate of change Rxd2 is smaller than the third rate of change Rxd3.

As shown in FIG. 8A, at the fourth current ix4, the temporal average value Rxa of the electrical resistance Rx of the stacked body 20 is the fourth resistance Rxa4. The absolute value of the fourth current ix4 is larger than the absolute value of the third current ix3. The fourth resistance Rxa4 may be higher than the first resistance ix1. As shown in FIG. 8B, at the fourth current ix4, the rate of change Rxd of the temporal average value Rxa of the electric resistance Rx is the fourth rate of change Rxd4. The absolute value of the fourth rate of change Rxd4 may be larger than the absolute value of the third rate of change Rxd3. In the fourth current ix4, the third magnetic layer 23 may function as an oscillation layer.

For example, from the characteristics illustrated in FIGS. 8A and 8B, the components of the characteristics of the quadratic function are removed and the characteristics of FIGS. 7A and 7B may be obtained. For example, the characteristics illustrated in FIGS. 7A and 7B may be obtained by a method of suppressing the temperature rise of the stacked body 20 (for example, measurement by a pulsed current).

In the embodiment, the first magnetic pole 31 may include multiple magnetic regions arranged along the X-axis direction. The second magnetic pole 32 may include multiple magnetic regions arranged along the X-axis direction. The boundaries between the magnetic regions may be clear or unclear. For example, the multiple magnetic regions are continuous.

In the following, an example of the magnetic head and the magnetic recording medium 80 included in the magnetic recording device 210 according to the embodiment will be described.

Figure 9:
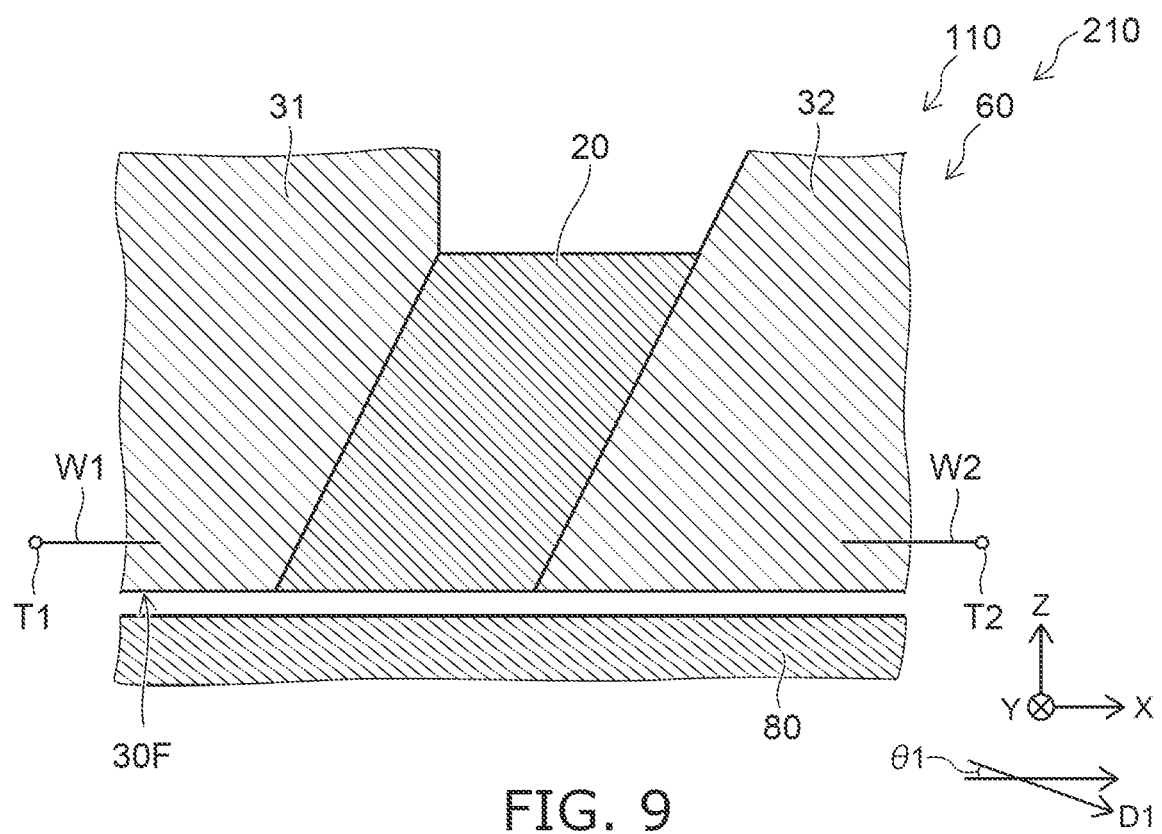
FIG. 9 is a schematic cross-sectional view illustrating the magnetic head according to the embodiment.

FIG. 9 is a schematic cross-sectional view illustrating the magnetic head according to the embodiment.

As shown in FIG. 9, in the magnetic head according to the embodiment (for example, the magnetic head 110), the first direction D1 from the first magnetic pole 31 toward the second magnetic pole 32 may be inclined with respect to the X-axis direction. The first direction D1 corresponds to the stacking direction of the stacked body 20. The X-axis direction is along the medium facing surface 30F. The absolute value of the angle between the first direction D1 and the medium facing surface 30F is taken as an angle θ1. The angle θ1 is, for example, not less than 15 degrees and not more than 30 degrees. The angle θ1 may be 0 degrees.

When the first direction D1 is inclined with respect to the X-axis direction, the thickness of the layer corresponds to the length along the first direction D1. The configuration in which the first direction D1 is inclined with respect to the X-axis direction may be applied to any magnetic head according to the embodiment. For example, the interface between the first magnetic pole 31 and the laminated body 20 and the interface between the stacked body 20 and the second magnetic pole 32 may be inclined with respect to the X-axis direction.

In the following, an example of the magnetic head and the magnetic recording medium 80 included in the magnetic recording device 210 according to the embodiment will be described.

Figure 10:
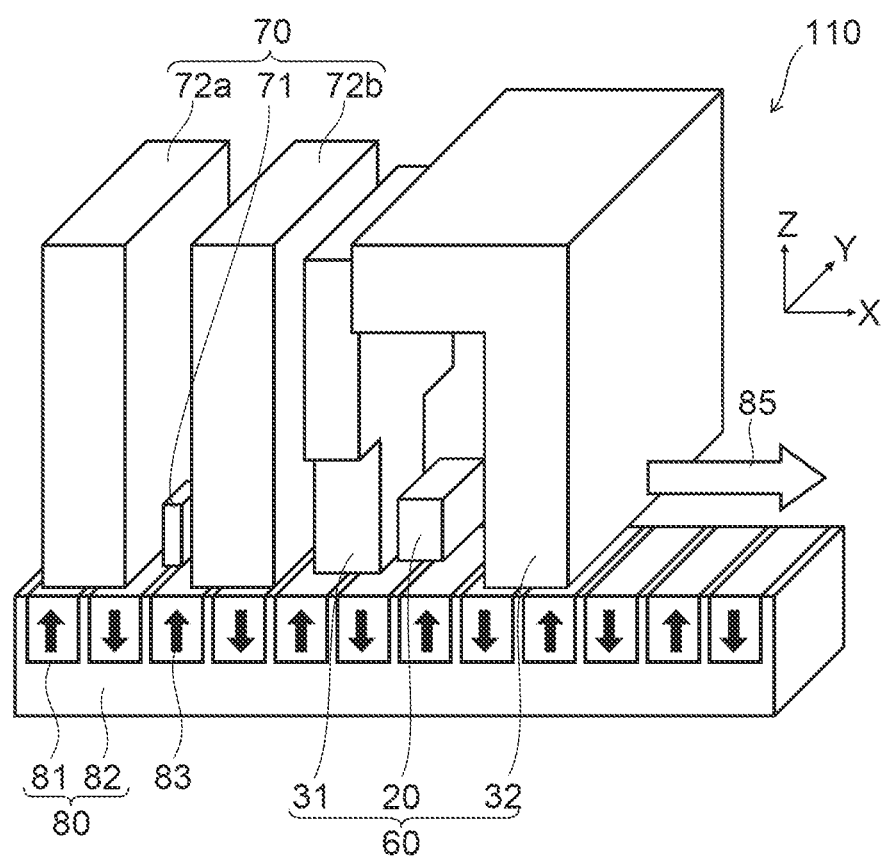
FIG. 10 is a schematic perspective view illustrating the magnetic recording device according to the embodiment.

FIG. 10 is a schematic perspective view illustrating the magnetic recording device according to the embodiment.

As shown in FIG. 10, the magnetic head according to the embodiment (for example, the magnetic head 110) is used together with the magnetic recording medium 80. In this example, the magnetic head 110 includes the recording part 60 and the reproducing part 70. Information is recorded on the magnetic recording medium 80 by the recording part 60 of the magnetic head 110. The reproducing part 70 reproduces the information recorded on the magnetic recording medium 80.

The magnetic recording medium 80 includes, for example, a medium substrate 82 and a magnetic recording layer 81 provided on the medium substrate 82. The magnetization 83 of the magnetic recording layer 81 is controlled by the recording part 60.

The reproducing part 70 includes, for example, a first reproducing magnetic shield 72a, a second reproducing magnetic shield 72b, and a magnetic reproducing element 71. The magnetic reproducing element 71 is provided between the first reproducing magnetic shield 72a and the second reproducing magnetic shield 72b. The magnetic reproducing element 71 is possible to output a signal corresponding to the magnetization 83 of the magnetic recording layer 81.

As shown in FIG. 10, the magnetic recording medium 80 moves relative to the magnetic head 110 in a direction of the medium movement direction 85. The magnetic head 110 controls the information corresponding to the magnetization 83 of the magnetic recording layer 81 at an arbitrary position. The magnetic head 110 reproduces information corresponding to the magnetization 83 of the magnetic recording layer 81 at an arbitrary position.

Figure 11:
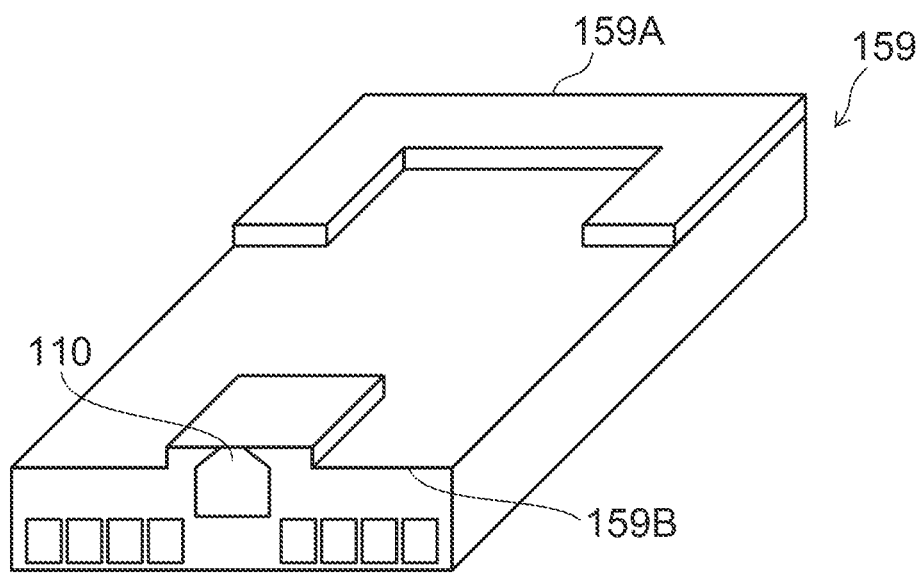
FIG. 11 is a schematic perspective view illustrating a portion of the magnetic recording device according to the embodiment.

FIG. 11 is a schematic perspective view illustrating a portion of the magnetic recording device according to the embodiment.

FIG. 11 illustrates a head slider.

The magnetic head 110 is provided on a head slider 159. The head slider 159 includes, for example, Al$_2$O$_3$/TiC and the like. The head slider 159 moves relative to the magnetic recording medium while floating or contacting the magnetic recording medium.

The head slider 159 includes, for example, an air inflow side 159A and an air outflow side 159B. The magnetic head 110 is arranged on the side surface of the air outflow side 159B of the head slider 159. As a result, the magnetic head 110 moves relative to the magnetic recording medium while floating or contacting the magnetic recording medium.

Figure 12:
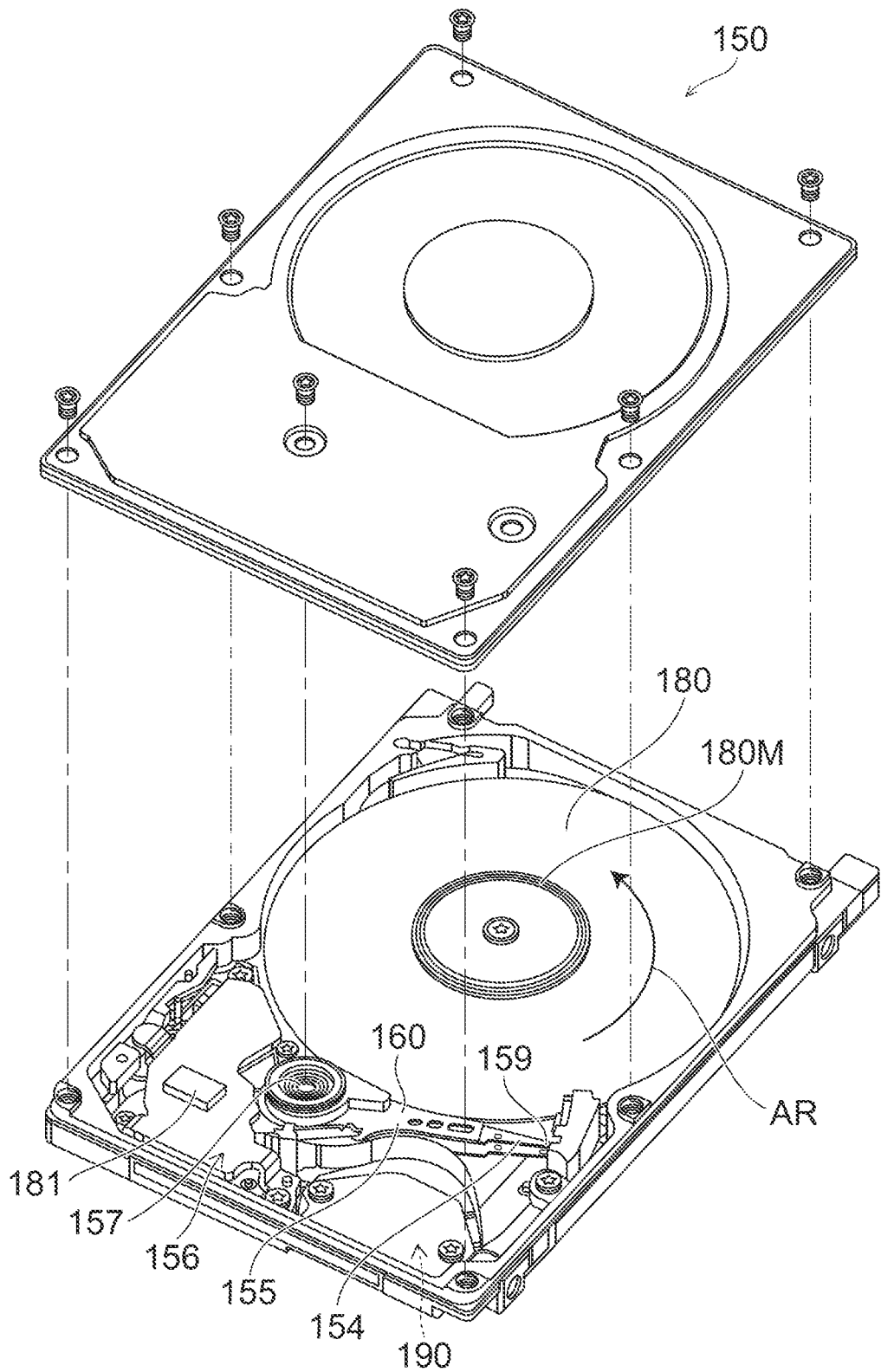
FIG. 12 is a schematic perspective view illustrating a magnetic recording device according to the embodiment.

FIG. 12 is a schematic perspective view illustrating a magnetic recording device according to the embodiment.

As shown in FIG. 12, in the magnetic recording device 150 according to the embodiment, a rotary actuator is used. A recording medium disc 180 is mounted on a spindle motor 180M. The recording medium disc 180 is rotated in the direction of an arrow AR by the spindle motor 180M. The spindle motor 180M responds to a control signal from the drive device controller. The magnetic recording device 150 according to the embodiment may include multiple recording medium disks 180. The magnetic recording device 150 may include a recording medium 181. The recording medium 181 is, for example, an SSD (Solid State Drive). As the recording medium 181, for example, a non-volatile memory such as a flash memory is used. For example, the magnetic recording device 150 may be a hybrid HDD (Hard Disk Drive).

The head slider 159 records and reproduces the information to be recorded on the recording medium disk 180. The head slider 159 is provided at the tip of the thin film suspension 154. A magnetic head according to the embodiment is provided near the tip of the head slider 159.

When the recording medium disk 180 rotates, the pressing pressure by a suspension 154 and the pressure generated on the medium facing surface (ABS) of the head slider 159 are balanced. The distance between the media facing surface of the head slider 159 and the surface of the recording medium disc 180 is a predetermined fly height. In the embodiment, the head slider 159 may contact the recording medium disc 180. For example, a contact-sliding type may be applied.

The suspension 154 is connected to one end of an arm 155 (e.g., an actuator arm). The arm 155 includes, for example, a bobbin portion and the like. The bobbin portion holds the drive coil. A voice coil motor 156 is provided at the other end of the arm 155. The voice coil motor 156 is a kind of linear motor. The voice coil motor 156 includes, for example, a drive coil and a magnetic circuit. The drive coil is wound around the bobbin portion of the arm 155. The magnetic circuit includes a permanent magnet and an opposed yoke. A drive coil is provided between the permanent magnet and the opposing yoke. The suspension 154 has one end and the other end. The magnetic head is provided at one end of the suspension 154. The arm 155 is connected to the other end of the suspension 154.

The arm 155 is held by a ball bearing. Ball bearings are provided at two locations above and below the bearing part 157. The arm 155 can be rotated and slid by the voice coil motor 156. The magnetic head can be moved to an arbitrary position on the recording medium disk 180.

Figure 13A:
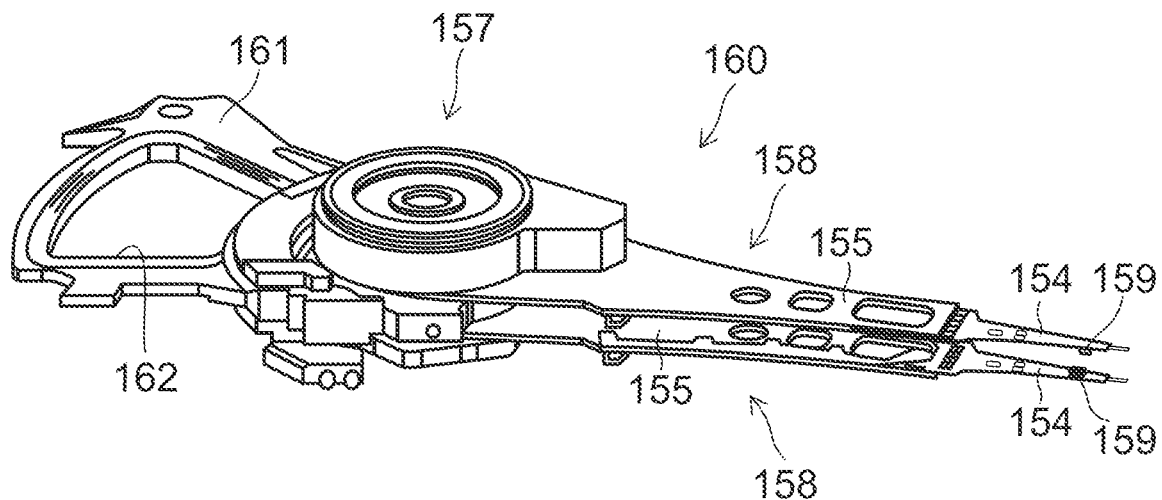
FIGS. 13A and 13B are schematic perspective views illustrating a portion of the magnetic recording device according to the embodiment.
Figure 13B:
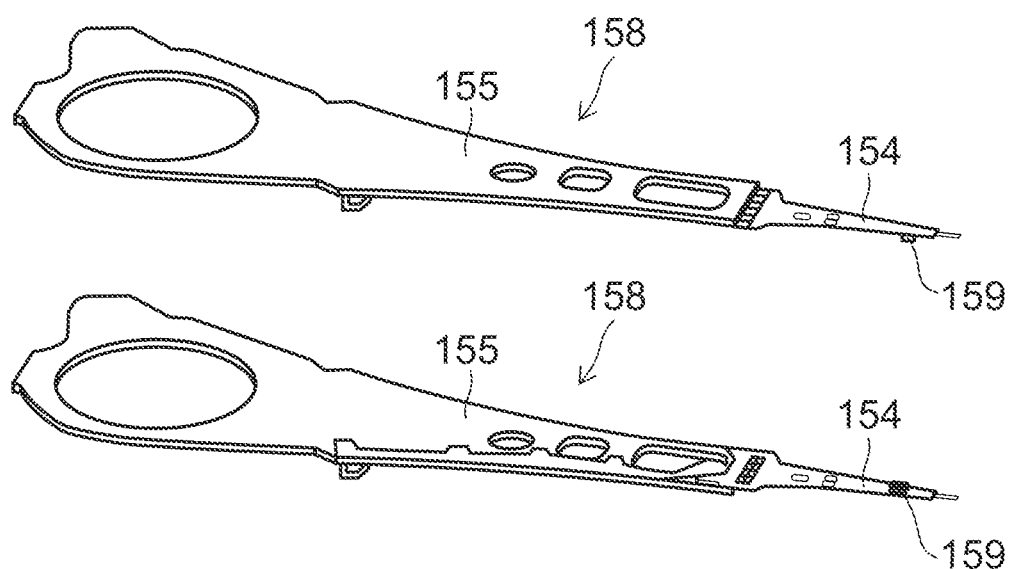

FIGS. 13A and 13B are schematic perspective views illustrating a portion of the magnetic recording device according to the embodiment.

FIG. 13A illustrates a partial configuration of the magnetic recording device and is an enlarged perspective view of a head stack assembly 160. FIG. 13B is a perspective view illustrating a magnetic head assembly (head gimbal assembly: HGA) 158 that is a portion of the head stack assembly 160.

As shown in FIG. 13A, the head stack assembly 160 includes the bearing part 157, the head gimbal assembly 158, and a support frame 161. The head gimbal assembly 158 extends from the bearing part 157. The support frame 161 extends from the bearing part 157. The extending direction of the support frame 161 is opposite to the extending direction of the head gimbal assembly 158. The support frame 161 supports a coil 162 of the voice coil motor 156.

As shown in FIG. 13B, the head gimbal assembly 158 includes the arm 155 extending from the bearing part 157 and the suspension 154 extending from the arm 155.

The head slider 159 is provided at the tip of the suspension 154. The head slider 159 is provided with the magnetic head according to the embodiment.

The magnetic head assembly (head gimbal assembly) 158 according to the embodiment includes the magnetic head according to the embodiment, the head slider 159 provided with the magnetic head, the suspension 154, and the arm 155. The head slider 159 is provided at one end of the suspension 154. The arm 155 is connected to the other end of the suspension 154.

The suspension 154 includes, for example, lead wires (not shown) for recording and reproducing signals. The suspension 154 may include, for example, a lead wire (not shown) for a heater for adjusting the fly height. The suspension 154 may include, for example, a lead wire (not shown) for a spin transfer torque oscillator. These lead wires and multiple electrodes provided on the magnetic head are electrically connected.

The magnetic recording device 150 is provided with a signal processor 190. The signal processor 190 records and reproduces a signal on a magnetic recording medium using a magnetic head. In the signal processor 190, the input/output lines of the signal processor 190 are connected to, for example, the electrode pads of the head gimbal assembly 158, and are electrically connected to the magnetic head.

The magnetic recording device 150 according to the embodiment includes the magnetic recording medium, the magnetic head according to the embodiment, a movable part, a position controller, and the signal processor. The movable part is relatively movable in a state where the magnetic recording medium and the magnetic head are separated or brought into contact with each other. The position controller aligns the magnetic head with a predetermined recording position on the magnetic recording medium. The signal processor records and reproduces a signal on a magnetic recording medium using a magnetic head.

For example, as the above-mentioned magnetic recording medium, the recording medium disk 180 is used. The movable part includes, for example, the head slider 159. The position controller includes, for example, the head gimbal assembly 158.

The embodiment may include the following configurations (e.g., technical proposals).

Configuration 1
  A magnetic head comprising:
  a first magnetic pole;
  a second magnetic pole; and
  a stacked body provided between the first magnetic pole and the second magnetic pole,
  the stacked body including
  a first magnetic layer,
  a second magnetic layer provided between the second magnetic pole and the first magnetic layer,
  a third magnetic layer provided between the second magnetic pole and the second magnetic layer,
  a first non-magnetic layer provided between the first magnetic layer and the first magnetic pole,
  a second non-magnetic layer provided between the second magnetic layer and the first magnetic layer,
  a third non-magnetic layer provided between the third magnetic layer and the second magnetic layer, and
  a fourth non-magnetic layer provided between the second magnetic pole and the third magnetic layer,
  a first thickness of the first magnetic layer along a first direction from the first magnetic pole toward the second magnetic pole being thicker than a second thickness of the second magnetic layer along the first direction, and
  a third thickness of the third magnetic layer along the first direction being thicker than the second thickness.

Configuration 2
  The magnetic head according to Configuration 1, wherein
  the first non-magnetic layer contacts the first magnetic layer and the first magnetic pole,
  the second non-magnetic layer contacts the second magnetic layer and the first magnetic layer,
  the third non-magnetic layer contacts the third magnetic layer and the second magnetic layer, and
  the fourth non-magnetic layer contacts the second magnetic pole and the third magnetic layer.

Configuration 3
  The magnetic head according to Configuration 1 or 2, wherein
  the third thickness is not less than 0.6 times and not more than 1.7 times the first thickness.

Configuration 4
  The magnetic head according to Configuration 1 or 2, wherein
  the third thickness is not less than 0.8 times and not more than 1.25 times the first thickness.

Configuration 5
  The magnetic head according to any one of Configurations 1 to 4, wherein
  the second thickness is not more than 0.7 times the first thickness.

Configuration 6
  The magnetic head according to any one of Configurations 1 to 4, wherein
  the second thickness is not more than 0.5 times the first thickness.

Configuration 7
  The magnetic head according to any one of Configurations 1 to 6, wherein
  the second thickness is not more than 0.7 times the third thickness.

Configuration 8
  The magnetic head according to any one of Configurations 1 to 6, wherein
  the second thickness is not more than 0.5 times the third thickness.

Configuration 9
  The magnetic head according to any one of Configurations 1 to 8, wherein
  the first thickness is not less than 5 nm and not more than 15 nm.

Configuration 10
  The magnetic head according to any one of Configurations 1 to 9, wherein
  the third thickness is not less than 5 nm and not more than 15 nm.

Configuration 11
  The magnetic head according to any one of Configurations 1 to 10, wherein
  the first non-magnetic layer includes at least one selected from the group of consisting Cu, Au, Cr, Al V and Ag, and
  the fourth non-magnetic layer includes at least one selected from the group consisting of Ru, Ir, Ta, Rh, Pd, Pt and W.

Configuration 12
  The magnetic head according to any one of Configurations 1 to 11, wherein
  the third non-magnetic layer includes at least one selected from the group of consisting Cu, Au, Cr, Al V and Ag, and
  the second non-magnetic layer includes at least one selected from the group consisting of Ru, Ir, Ta, Rh, Pd, Pt and W.

Configuration 13
  The magnetic head according to any one of Configurations 1 to 12, wherein
  the first magnetic layer, the second magnetic layer and the third magnetic layer include at least one element including at least one selected from the group consisting of Fe, Co, and Ni.

Configuration 14
  The magnetic head according to Configuration 13, wherein
  the first magnetic layer, the second magnetic layer and the third magnetic layer do not include a second element including at least one selected from the group consisting of Cr, V, Mn, Ti and Sc, or a concentration of the second element in the first magnetic layer, the second magnetic layer and the third magnetic layer is less than 10 atm %.

Configuration 15
  The magnetic head according to any one of Configurations 1 to 14, wherein
  a current having a direction from the first magnetic layer toward the second magnetic layer is supplied to the stacked body.

Configuration 16
  The magnetic head according to Configuration 15, wherein
  when the current is supplied to the stacked body, an alternating magnetic field is generated from the stacked body.

Configuration 17
  The magnetic head according to any one of Configurations 1 to 14, wherein
  when a current having a direction from the first magnetic layer toward the second magnetic layer is supplied to the stacked body, a first magnetization of the first magnetic layer and a third magnetization of the third magnetic layer rotate in reverse phases.

Configuration 18
  The magnetic head according to any one of Configurations 1 to 17, further comprising: a first terminal and a second terminal, the first terminal being electrically connected to a portion of the stacked body, the second terminal being electrically connected to another portion of the stacked body, and a current being configured to be supplied between the first terminal and the second terminal.

Configuration 19

A magnetic recording device comprising:

the magnetic head according to any one of configurations 1 to 14; and an electric circuit, the electric circuit being configured to supply a current to the stacked body, and the current having a direction from the first magnetic layer toward the second magnetic layer.

Configuration 20

The magnetic recording device according to Configuration 19, wherein when the electric circuit supplies the current to the stacked body, an alternating magnetic field is generated from the stacked body.

According to the embodiment, a magnetic head and a magnetic recording device, in which a recording density is possible to be improved, can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic heads such as magnetic poles, stacked bodies, magnetic layers, non-magnetic layers, wirings, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic heads, and magnetic recording devices practicable by an appropriate design modification by one skilled in the art based on the magnetic heads, and the magnetic recording devices described above as embodiments of the invention also are within the scope of the invention to the extent that the purport of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic head comprising:
a first magnetic pole;
a second magnetic pole; and
a stacked body provided between the first magnetic pole and the second magnetic pole,
the stacked body including
a first magnetic layer,
a second magnetic layer provided between the second magnetic pole and the first magnetic layer,
a third magnetic layer provided between the second magnetic pole and the second magnetic layer,
a first non-magnetic layer provided between the first magnetic layer and the first magnetic pole,
a second non-magnetic layer provided between the second magnetic layer and the first magnetic layer,
a third non-magnetic layer provided between the third magnetic layer and the second magnetic layer, and
a fourth non-magnetic layer provided between the second magnetic pole and the third magnetic layer, wherein
the first non-magnetic layer contacts the first magnetic layer and the first magnetic pole,
the second non-magnetic layer contacts the second magnetic layer and the first magnetic layer,
the third non-magnetic layer contacts the third magnetic layer and the second magnetic layer, and
the fourth non-magnetic layer contacts the second magnetic pole and the third magnetic layer,
a first thickness of the first magnetic layer along a first direction from the first magnetic pole toward the second magnetic pole being thicker than a second thickness of the second magnetic layer along the first direction, and
a third thickness of the third magnetic layer along the first direction being thicker than the second thickness.

2. The head according to claim 1, wherein
the third thickness is not less than 0.6 times and not more than 1.7 times the first thickness.

3. The head according to claim 1, wherein
the third thickness is not less than 0.8 times and not more than 1.25 times the first thickness.

4. The head according to claim 1, wherein
the second thickness is not more than 0.7 times the first thickness.

5. The head according to claim 1, wherein
the second thickness is not more than 0.5 times the first thickness.

6. The head according to claim 1, wherein
the second thickness is not more than 0.7 times the third thickness.

7. The head according to claim 1, wherein
the second thickness is not more than 0.5 times the third thickness.

8. The head according to claim 1, wherein
the first thickness is not less than 5 nm and not more than 15 nm.

9. The head according to claim 1, wherein
the third thickness is not less than 5 nm and not more than 15 nm.

10. The head according to claim 1, wherein
the first non-magnetic layer includes at least one selected from the group of consisting Cu, Au, Cr, Al, V and Ag, and
the fourth non-magnetic layer includes at least one selected from the group consisting of Ru, Ir, Ta, Rh, Pd, Pt and W.

11. The head according to claim 1, wherein
the third non-magnetic layer includes at least one selected from the group of consisting Cu, Au, Cr, Al, V and Ag, and
the second non-magnetic layer includes at least one selected from the group consisting of Ru, Ir, Ta, Rh, Pd, Pt and W.

12. The head according to claim 1, wherein
the first magnetic layer, the second magnetic layer and the third magnetic layer include at least one element including at least one selected from the group consisting of Fe, Co, and Ni.

13. The head according to claim 12, wherein
the first magnetic layer, the second magnetic layer and the third magnetic layer do not include a second element including at least one selected from the group consisting of Cr, V, Mn, Ti and Sc, or a concentration of the second element in the first magnetic layer, the second magnetic layer and the third magnetic layer is less than 10 atm %.

14. The head according to claim 1, wherein
a current having a direction from the first magnetic layer toward the second magnetic layer is supplied to the stacked body.

15. The head according to claim 14, wherein
when the current is supplied to the stacked body, an alternating magnetic field is generated from the stacked body.

16. The head according to claim 1, wherein
when a current having a direction from the first magnetic layer toward the second magnetic layer is supplied to the stacked body, a first magnetization of the first magnetic layer and a third magnetization of the third magnetic layer rotate in reverse phases.

17. The head according to claim 1, further comprising:
a first terminal; and a second terminal,
the first terminal being electrically connected to a portion of the stacked body,
the second terminal being electrically connected to another portion of the stacked body, and
a current being configured to be supplied between the first terminal and the second terminal.

18. A magnetic recording device comprising:
the magnetic head according to claim 1; and
an electric circuit,
the electric circuit being configured to supply a current to the stacked body, and
the current having a direction from the first magnetic layer toward the second magnetic layer.

19. The device according to claim 18, wherein
when the electric circuit supplies the current to the stacked body, an alternating magnetic field is generated from the stacked body.

* * * * *